Sept. 14, 1954 W. C. WEBER 2,688,823
METHOD AND APPARATUS FOR FORMING GLASS PARISONS
Filed Nov. 20, 1950 3 Sheets-Sheet 1
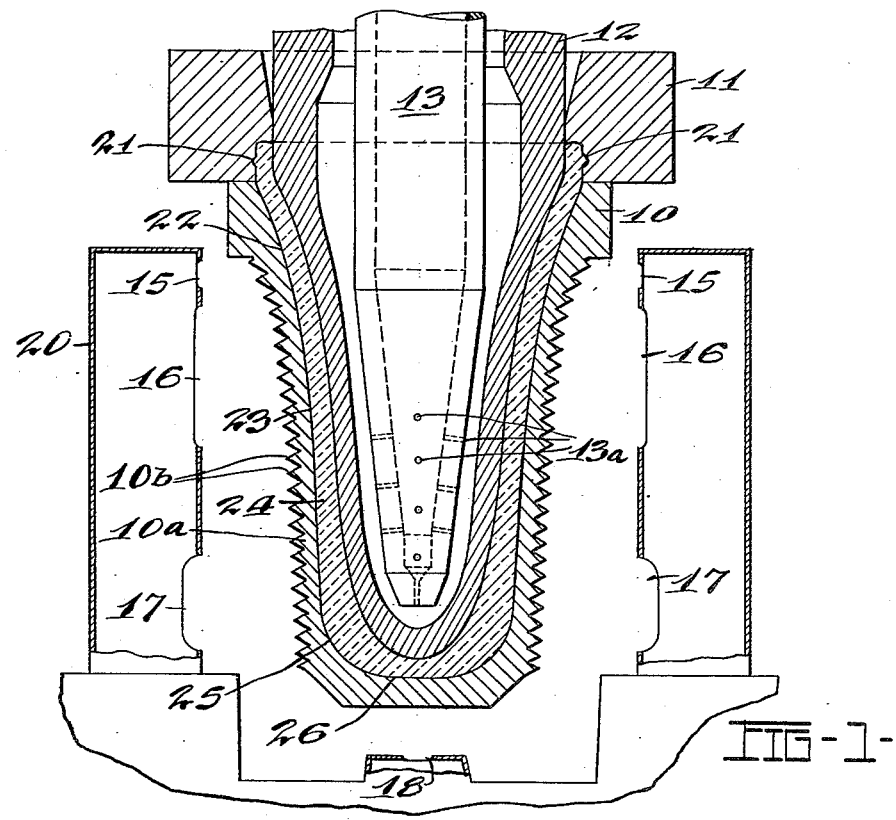
FIG-1-
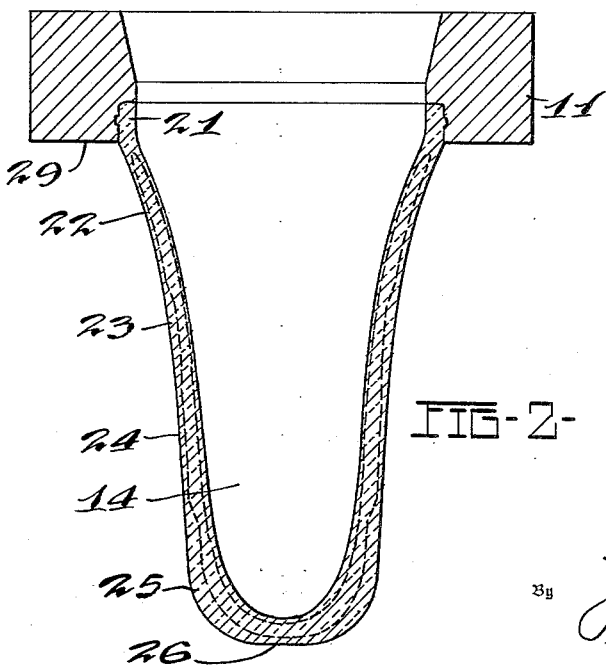
FIG-2-
Inventor:
WALTER C. WEBER.
By Rule and Hoge.
Attorney Sept. 14, 1954 W. C. WEBER 2,688,823
METHOD AND APPARATUS FOR FORMING GLASS PARISONS
Filed Nov. 20, 1950 3 Sheets-Sheet 2
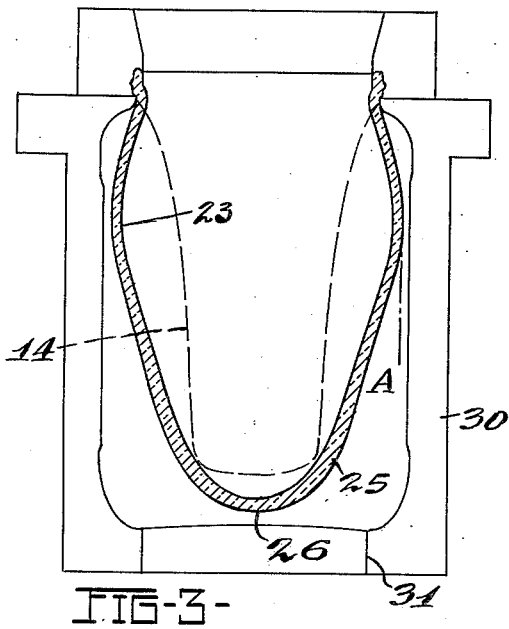
FIG-3-
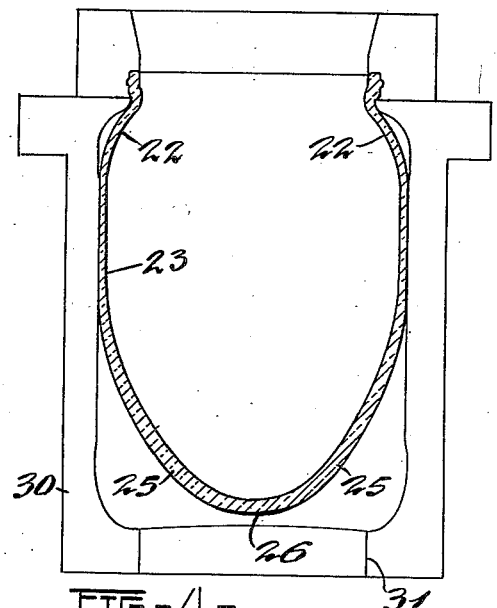
FIG-4-
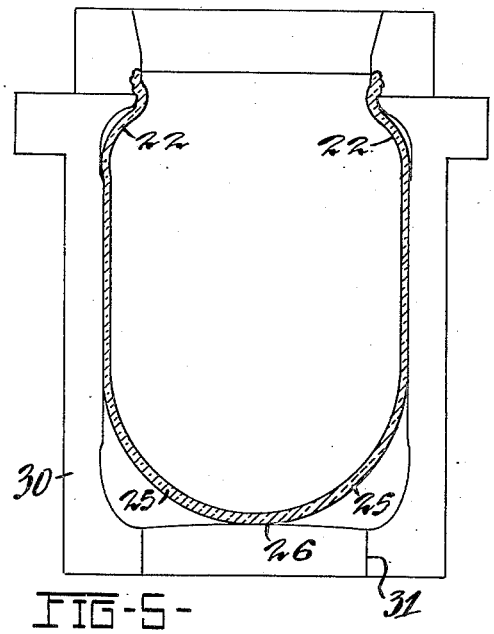
FIG-5-
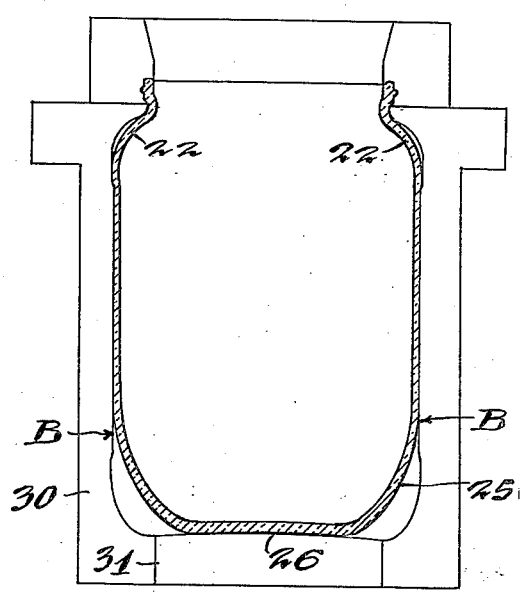
FIG-6-
Inventor:
WALTER C. WEBER.
By Rule and Hoge,
Attorney Sept. 14, 1954  W. C. WEBER  2,688,823
METHOD AND APPARATUS FOR FORMING GLASS PARISONS
Filed Nov. 20, 1950  3 Sheets-Sheet 3
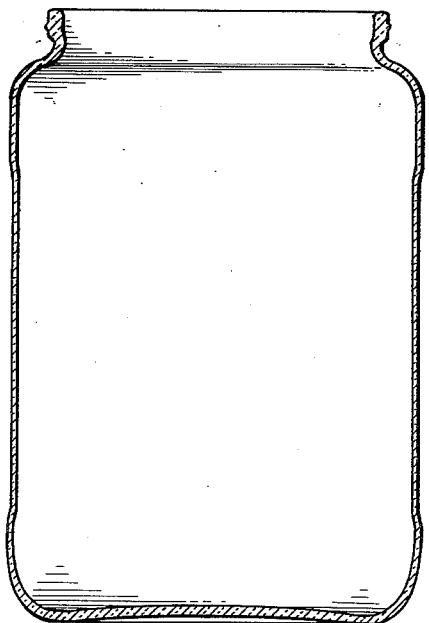
FIG-7-
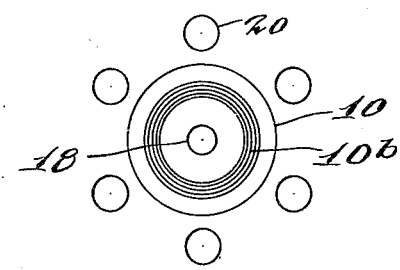
FIG-8-
Inventor:
WALTER C. WEBER.
By Rule and Hoge.
Attorney Patented Sept. 14, 1954

2,688,823

UNITED STATES PATENT OFFICE 2,688,823

METHOD AND APPARATUS FOR FORMING GLASS PARISONS

Walter C. Weber, Temperance, Mich., assignor to Owens-Illinois Glass Company, a corporation of Ohio Application November 20, 1950, Serial No. 196,680

5 Claims. (Cl. 49—68)

This invention relates to the manufacture of glass containers, such as bottles of various shapes and other hollow glass articles.

In the prior art manufacture of glass articles, the usual or normal procedure is to charge a mold and either press or manipulate the glass in the various known manners without particular regard to the distribution of the glass in the various wall sections of the final article, other than in a general manner.

Recent art indicates an attempt to thicken the wall sections at certain vulnerable points, such as the shoulders, where the glass tends to blow out too thin during the expansion of the parison to finished form. By supplying an excess of chill, in a portion of the blank or parison which, upon expansion, will put more weight into the vulnerable point, this thickening is accomplished. Another measure of the prior art for attempted control of distribution is the stretching of the parison prior to blowing, but this is a measure that is not accurately controllable for the reasons that it depends essentially upon atmospheric exposure, the action of gravity and timing. Most of the attempts of the prior art have been toward a perfect equalization of glass distribution throughout the wall sections of the glass articles.

The present invention embodies novel features materially different from and substantial improvements over the above described prior art, as set forth hereinafter.

An object of the present invention is to provide a method whereby, in the expansion of a parison to final form, the distribution of glass in all the various wall sections of the finally formed article may be regulated and controlled as desired.

A further object is to provide a method whereby the expansion of a parison, in all of its various portions, may be fully controlled to thereby control and guide the flow of glass into contact with given and predetermined portions of the walls of the final mold and in predetermined thicknesses.

Another object is to provide a parison of a type which in certain predetermined portions will resist expansion pressure in a controlled manner.

A still further object is to provide a parison capable of being expanded to final form but having sufficient rigidity to resist stretching and distortion due to gravity, shock or abrupt movements.

Other objects will be apparent from the following description.

In the drawings:

Fig. 1, a sectional elevational view, illustrates the cooperative mold and plunger parts in pressing position and the arrangement of the cooling nozzle openings with respect to the parison and its shaping mold;

Fig. 2 shows the parison suspended from the neck mold and the relatively cool and hot surface areas imparted at pressing;

Figs. 3 to 6, both inclusive, illustrate the controlled directional expansion of the chilled parison;

Fig. 7 shows the finally blown article; and

Fig. 8 is a view showing diagrammatically the positioning of the air nozzles about the vertical axis of the parison mold.

The essence of this present invention is to so form and chill a parison of hot glass, throughout its entire surface area, both internal and external, and particularly in all portions of its external surface area, that a fully controlled resistance to the blowing, or expansion of said parison is created, with such resistance differing in specific spaced apart external surface portions through the total length of the parison and with the variance in resistance of the intermediate portions being in a desired predetermined proportion to the resistance originally created in said spaced apart portions. In this manner, the type and rate of expansion of any one portion with respect to other portions of the parison, that will occur under blowing pressure, can be controlled to a rather exact degree and by controlling the expansion of the parison in this manner the distribution of glass in the various sections of the walls of the final article can be predetermined and so regulated and controlled that any desired thicknesses may be obtained throughout the walls of the finished article.

This method of controlling chilled surface areas may also be applied to a straight pressing operation wherein no expansion occurs subsequent to pressing. The present modern press machine or the press and blow type of machine may be used in practicing this invention.

In the following description, the invention is described as applied to the press and blow type of machine but it will be apparent from the disclosure that the invention is not confined to this particular type of machine, but may be applied to other present day commercial type machines.

In the usual press and blow machine, a charge of glass is deposited in the parison mold, the press plunger descends and forces the molten glass to spread upwards and outwards to the confining walls of the parison and neck molds. There-after the parison and parison mold are separated by relative vertical motion, or otherwise, and a blowing mold is closed about the parison. Air under pressure is admitted to the parison, expanding it to the walls of the blow mold and holding the expanded glass thereagainst until sufficiently set for removal.

The parison mold of such a machine is made of metal, is usually bulky and heavy, and low pressure cooling air is impinged upon its outer surfaces in an unrestricted and random envelopment, without any pattern of cooling and with no attempt to vary or control the imparted chill in any particular pattern.

The usual attempt to control distribution of glass in the final article is by varying the shape and weight of the parison by varying the thickness of the mold walls.

The basic theory herein is the predetermined control of the formation of the parison; the control of the type of expansion of said parison and in such manner that a predetermined distribution of glass throughout the wall portions of a hollow glass article may be obtained particularly in those portions of the article below the parting line between the neck mold and the body or blank mold. Those familiar with or versed in the art understand that the portions of the article above the parting line, above described, remain as initially formed and no need for control of expansion or distribution therefore exists in said portions.

However, in the portions below the parting line, there exists a definite need for control both of expansion and distribution and the type and amount of such need varies with the shape and size of the article being produced.

In practicing the present method the parison mold used is of single-piece construction with extremely thin wall sections and very light weight; the parison shape follows as closely as possible the shape of the final article; the wall sections of the parison are thin and of approximately equi-thickness through its length and the degree of cooling of the parison mold is varied throughout its internal surface area, in a predetermined pattern in order that the areas of molten glass, coming into contact with the chill pattern of the mold walls will receive and acquire the same chill pattern.

In the making of any specific glass article, the chill pattern required for the specific blank or parison, to obtain a controlled and preferred type of expansion as well as the most desirable distribution of glass in the walls of the final article, may be obtained by positioning a series of air nozzles about the outer surfaces of the blank mold, in such a manner and location that a specific pattern of chill is imparted to the mold and which will be imparted to the desired areas of the parison in the same predetermined pattern.

The individual nozzles are provided with a particular pattern of openings thru which air under pressure is emitted, to impinge upon the outer walls of the mold in a similar pattern and with the said openings having predetermined air emission capacities. The nozzles are arranged in a series surrounding the mold and equally spaced apart, and every nozzle of the series provided for a specific glass article, is identical both as to emission capacity and location of openings thus giving an identical cooling pattern throughout the circumference of the mold and eventually to the glass contacting the mold surface during the parison forming operation.

In the series of Figs. 2 to 7 of the present drawings there is shown the evolution of a particular container, beginning with the bare parison, as stripped from the parison mold 10, with its series of chilled portions, and the subsequent development of this parison into a fully formed article, the time intervals between successive phases of expansion being approximately equal in duration.

The accompanying drawings illustrate a food jar, of a commercial production type, of very light weight, in which, it is not the desire to obtain an equal glass distribution throughout the wall areas, but to put the glass in sufficient quantity in specific places to provide the ultimate in strength. Equalization of wall thicknesses is not in and of itself the criterion of high strengths, although it does play its part when properly utilized, i. e., an equalized distribution of glass through a given wall section is desirable, but controlled variation in thickness in various annular portions of the wall sections at different points through the length of the article, with the thickness of the individual portions being equalized throughout their circumference is more desirable for gaining the ultimate in strength.

For example, in the processing of these containers in a packing plant, they are subject to thermal shocks of various types and this requires that there be no abrupt wall thickness changes through the glass sections. Impact also has to be contended with and therefore the side walls, should be so controlled, as to thickness in specific circumferential areas, that they will withstand the impact.

In addition, the capping or closing of the container requires that sufficient strength must be present in the shoulders and the sidewalls to withstand the vertical pressures used for this operation.

Also in the packing of filled containers into cartons for shipment, they are subject to hydrostatic pressure shocks which requires that the bottom and sidewalls, both, be of such thickness and distribution as to withstand such pressures.

To satisfy the above requirements in glass container manufacture requires therefore that a method of manufacture be utilized that permits predetermined regulation and control of the formation and expansion of the parison and the final distribution of glass in the wall sections of the container. Therefore, in order to obtain this ultimate in production and quality the method of the present invention is utilized, i. e., a method wherein at the time of expansion of the parison the particular portions of glass first contacting the walls of the blow mold and the flow of glass during expansion of said parison may be controlled and regulated as desired, and as shown and described herein.

It will be noted from Figs. 1 and 2 that the cross-sectional dimensions of the walls of the parison are approximately or nearly of equal cross section throughout the greater portion of the parison length and that these dimensions are extremely small as compared to the usual practice in the industry.

The use of very thin wall sections in the formation of a parison is possible in this method of parison forming because of the extremely high speed of formation, the use of controlled temperature areas in the plunger and parison mold to provide controlled similar temperature areas in the parison as formed and the predetermined regulation and control of the wall thickness of the parison.

Through regulation and control of the forming pressures and time intervals of plunger and mold contact with the glass, the surface areas of the parison 14 in contact with the plunger and mold will, during the formative period, receive a predetermined chill pattern on said surface areas.

In order to obtain control of expansion of the parison to final form, the wall sections thereof, in cross-sectional dimension or thickness, must be predetermined and the chilling of the total surface areas of the parison must also be predetermined with relation to the type of expansion required in a specific or particular shape of article in order to obtain the desired wall thickness control in the final article by and through control of the rate of expansion of predetermined portions of the parison. In addition, it is necessary to control the vertical flow of heat in the walls of the mold and plunger in order to obtain and maintain a predetermined chill pattern.

In the formation of a parison by this method, a charge of molten glass is fed into the parison mold 10, plunger 12 is moved down, under controlled pressure, into contact with the molten glass, thereby forcing it into the outer confines of the parison mold 10 and neck mold 11 to form the shaped parison 14.

Referring to Fig 1 of the drawings, there is shown a single-piece blank mold 10, strip ring 11 and a plunger 12 in pressing position with the molten glass in contact with the surfaces of the mold and plunger. Plunger 12 is provided with an internal cooling nozzle 13 through which a flow of cooling air is provided internally of the plunger. Said flow may be of a type to provide either an equalized or a zonal chilling of the glass coming into contact with the external surface of the plunger 12 by arranging openings 13a in any desired pattern and air volume.

Thus the vertical flow of heat in the walls of the plunger 12 may be regulated and controlled to thereby control the pattern of chill imparted to the glass.

Air nozzle openings 15, 16, 17 and 18 are indicated and shown positioned in the manner required for obtaining the desirable predetermined pattern of chill in the parison mold and parison for the specific container illustrated.

The arrangement and location of the cooling nozzle openings 15, 16, 17 and 18, as above pointed out, is specific to the particular container shown and with the area of each of said openings being also specific to this particular container. In other words, the vertical arrangement of the nozzle openings, the proximity of the nozzles 20 to the mold, the cooling volume of each nozzle opening, and the specific cooling pattern obtained, are specific to the container shown and in the case of a different container, the vertical arrangement, volume of cooling and the cooling pattern may and will change with the change in shape and size of container.

Thus it should be apparent that with each individual style of container, an individual pattern of cooling of the parison is a necessity in order to produce a container having all of the previously described attributes necessary or desirable in its ultimate use.

The basic theory of pattern cooling remains the same in any instance, i. e., the total surface area of the parison is cooled, both inside and outside, with such cooling being regulated and controlled throughout said total surface area in accordance with shape and size of the finished container and for obtaining both control of expansion and the ultimate in strength, particularly in light-weight ware.

Nozzle opening 15 illustrates a restricted area flow of air, nozzle opening 16 a medium flow, nozzle opening 17 a full flow of air, and nozzle opening 18 indicating a desirable flow for bottom contact.

The required area of each air flow opening depends upon the pressure of the air and the velocities utilized as well as the degree of chill ultimately desired in any specific surface area of the glass. It will be noted that these nozzle openings are spaced apart vertically, in such manner as to provide a series of zones or bands of chilled surface area throughout the length of the parison. In order to have a uniform temperature throughout the circumference of a chill zone, more than one nozzle 20 will be required and these nozzles will be equally spaced circumferentially (as shown in Fig. 8 of the drawings) around the vertical axis of the mold in the required number to avoid unequal circumferential cooling in the various cooled zones.

It will be noted from Fig. 1, that the nozzle openings have a certain vertical disposition in each nozzle 20 with respect to the ribs 10b, that is, these openings are so arranged that the center lines of the streams of high velocity air are midway between the ribs thus providing a confinement of the air streams within certain vertical areas. In this manner the air streams from nozzle openings 15, for example, are confined to the surface areas of three rib formations thus giving a marked chill pattern in this area.

By varying the number of ribs 10b affected, the surface area of the ribs upon which the air is impinged, the spacing between said ribs, the volume of air applied and confining the air streams between predetermined ribs, a chill pattern of predetermined pattern may be formed in the walls of the mold by this restriction and control of the vertical flow of heat in the parison mold walls and with said pattern subsequently imparted to the molten glass when brought into contact therewith. Any variation of the surface areas of the rib formations will be uniform throughout the entire rib structure in order that the function of the ribs, namely, extraction of heat will be uniform throughout the mold area, when subjected to uniform cooling air volumes. This will permit obtaining a specific and predetermined cooling pattern by regulating the area and volume of air impingement at a given point or points.

It should be understood that this impingement of high velocity air upon the outer surfaces of the mold is a continuous operation, so that when the mold is empty, the chill zones are consequently accentuated, because of the rapid extraction of B. t. u. as well as the momentary absence of a source of supply of further heat, and as glass is again supplied to and pressed into the mold, these mold chills are rapidly imparted to the contacting glass, to a degree, depending upon the temperature of the glass at contact and the length of time of contact.

Thus, with the glass pressed into a parison 14 wherein the horizontal cross-sectional areas or thickness of the parison walls are approximately equal, as shown in Fig. 1, and with the above described air nozzles in action, a series of circumferential chill areas of predetermined pattern will be created in the external surface area of the parison 14 by and through the impingement of the air streams in a predetermined and controlled pattern upon the single-piece parison mold 10. Preferably, high velocity air is here utilized, say on the order of 9000 ft./min., depending upon the temperature of the molten glass, in order to obtain the desired chill pattern in a given time interval.

The blank mold 10 is a very light-weight mold with no openings therein other than its stop opening for reception of the molten glass, it is made in a single piece, having extraordinarily thin walls 10a, of approximately equal cross-sectional area throughout and with a series of horizontal rib formations 10b, all having approximately equal cross-sectional areas and forming horizontal discontinuous grooves on the outer peripheral surface of the mold.

It will be noted from Fig. 1 that the thickness of the wall section of mold 10 is approximately equal throughout its entire contour and it is specifically made thin and equal in cross section in order that a definite control of B. t. u. flow and extraction may be obtained and maintained throughout the mold wall area by application of controlled volumes of air flow or impingement in a specific pattern on the outer mold surfaces.

Thus with an approximately equalized mold wall condition it is only necessary to control the velocity of the coolant and the pattern of impingement upon the forming mold 10 in order to obtain a predetermined pattern of parison chilling. This distinguishes from the prior art procedure of varying portions of the wall thickness of the parison or the parison mold and the shape of the parison to obtain thereby only a limited and haphazard control of glass distribution.

The location of the nozzle openings and the emission area of each opening is such as to impinge air upon or between one or more of these rib-like formations 10b, thus extracting heat from these impinged-upon portions, in an amount commensurate with the volume of flow of air and the total surface area of the formations 10b exposed to the high velocity flow of air.

Thus these rib formations 10b provide a means for preventing or restricting flow of heat vertically through the mold wall sections and with the air impingement therebetween and thereon the flow of heat is outward through the ribs. This results in a marked pattern of chill in well defined circumferential areas throughout the total length of the parison.

The nozzles 20 are located in such close proximity to the mold 10 that the vertical spread of any air stream impinging on the mold is confined to a limited vertical surface area, thus providing a finely marked area of chill control.

Thus, with this thin mold wall formed in a single piece, with nozzle openings directing air thereagainst at high velocity and confined to defined and restricted areas of impingement defining a predetermined chill pattern, it is apparent that the hot glass, when pressed into contact with the inner mold wall surface having such a predetermined chill pattern and for a time period of one or two seconds, will have heat extracted in a similar pattern, resulting in a chilled external surface area of such pattern upon the glass and as the glass is subsequently expanded into final form, these chilled areas will expand under a predetermined expansion pressure at a rate commensurate with the degree of chill obtaining in each such zone.

Referring to Fig. 2 in which the degree and depth of chill are indicated in a general way by the dotted lines, it will be noted that the neck 21 has a permanent chilled area that does not move after the pressing, while below this will be found a hot or lightly chilled area 22, next a cold or heavy chill area 23 followed by a lengthy area 24 comparatively hot, or of light chill. Near the bottom of parison 14 is a heavy chill area 25 while the extreme bottom area 26 is a lightly chilled area.

From the above, it will be apparent that there is thus formed below the parting line between the neck and blank molds, a series of complete circumferential chill areas, spaced apart vertically with intervening circumferential areas of lesser chill or comparatively hot, said series extending the full length of the parison to thereby provide a controllable chilled surface area throughout the total outer surface area of the parison.

It will be noted that the plunger 12 is arranged for internal cooling but that its cooling as shown, is equalized or made approximately uniform throughout so that a uniformly distributed chill may thus be imparted to the inner surface portions of the parison 14. However, the cooling of the plunger in some instances may also be in vertically arranged chill zones in order that the vertical flow of heat in the plunger may be controlled and restricted.

Therefore, with the parison 14 having an equalized or uniformly internally chilled surface area and a series of alternate hot and cold chill areas on the external surface, the action of gravity will be resisted by the rigidity thus provided in proportion to the degree of chill in each said area. This rigidity of the parison 14 prevents the loss of control of the parison (that is, of its shape), which loss, invariably results in preventing subsequent control of expansion of the parison to final form. Also in expanding the parison to final form it should be apparent that the cold chill areas will tend to resist expansion and thus provide control of the rate of expansion of these zones and the flow of glass in said areas. The hot or lightly chilled areas will under blowing pressure, tend to freely expand and stretch both vertically and horizontally and at the same time tend to carry the heavier chilled areas with them.

By reference to Fig. 3 which shows the first step in expansion of the parison by admission of air internally of the parison and under a predetermined and constant pressure, it will be noted that the neck 21 shows no change, but the hot area 22 has expanded and stretched, carrying cold area 23 with it, while at the same time thinning or stretching cold area 23. Hot area 24 has simultaneously elongated which, together with the stretch of hot area 26, has lengthened the parison and slightly thinned and expanded the cold area 25. It will be noted that cold area 25 has also expanded and stretched outwardly and downwardly carried by the stretch and expansion of areas 23 and 26. The high point of expansion at this time, as indicated by line A, has not as yet reached the confines of the blowing mold 30 so that further expansion and stretch of these portions will obtain.

By referring to Fig. 4 it will be noted that in the continuity of the expansion movement, the cold area 23 has expanded and stretched to the point of contact with the mold wall 30, thus becoming stationary, so far as further radial expansion is concerned. However, hot areas 22 and 24 are now forced to move outwardly as well as upwardly and downwardly respectively, thus providing a stretching action within themselves as well as in portion 23 as the balance of the glass in areas 22 and 24 seeks mold wall contact.

In Fig. 5 the extent of the mold side wall contact has been approximately doubled as compared with Fig. 4 and the hot shoulder portions 22 are moving outward and upwards toward the mold wall 30, stretching the glass in this portion as it moves. Also the cold portion 25 is moving outwardly and downwardly, stretching and thinning as it moves.

By referring back to Fig. 2 and following through to Fig. 6 it will be noted that the cold areas 23 and 25, will because of their heavy chill, resist expansion and that this resistance causes a thinning and equalization of distribution of the glass in these particular wall sections. Further, the deliberate placement or positioning of these chill area and the control of their depth of chill together with the predetermined depth of chill in areas 22, 24 and 26 permit this control of expansion and control of wall thickness in the various portions or areas of the parison as above outlined.

From Fig. 6 it will be noted that the area 22 of the parison has just about filled out the shoulder portions of the mold, that area 25 has now begun to thin out and that area 26 has contacted the bottom plate 31.

There will now be set up, a stretching of the glass between the mold contact point B and the point of glass contact with the bottom plate 31, finally resulting in the distribution shown in Fig. 7.

Thus through the utilization of these hot and cold chill areas 22—26, originally formed in the outer surface area of the parison 14 the expansion of the blank or parison has been accomplished in a predetermined controlled manner and the glass forming the original parison has been distributed in the proper predetermined and desirable proportions and thicknesses throughout the various sections of the wall of the container.

It should be apparent from the foregoing description that a lesser or greater degree of chill in the cold areas will affect the type of expansion and distribution of glass and that a reversal of the chilled portions from that shown and described herein will also affect the type of expansion and distribution.

Therefore, by varying the degree or depth of chill in the various bands or areas of chill and by varying the position and/or width of the several bands or areas of chill any desired type of controlled expansion and distribution of glass in the walls of the final article may be obtained.

One of the outstanding characteristics in this situation is the adaptability of this method of parison and expansion control individually to each particular form of container being made. For example, the cooling and expansion shown in Figs. 2–7 is specific to a particular light-weight jar made at a speed considerably in excess of usual productive speeds. If another jar, in this same series is to be made, for example, one shorter in height and of less weight, then the cooling pattern will change in degree of chill and width of band but because of the similarity in the shape of the articles the cooling pattern will appear quite similar to that shown in the drawings.

However, if the same height jar is made, at the same weight but of different shape, then the pattern of cooling may radically change, but regardless of the change, a series of chilled surface areas will be provided in specific and predetermined vertical locations on the parison in order to control expansion, provide a parison not easily deformed by impact or inertia and regulate distribution of glass in the walls of the final article as it is blown.

From the preceding it should then be apparent, that by setting up these predetermined zones, bands or areas of chill, throughout the length and over the total surface area of a hot glass parison, and in a predetermined chill pattern specifically adapted to the particular final shape of article desired, these areas of resistance to expansion are provided, which force the glass, under expansion pressure, to flow in a predetermined pattern, direction and rate and into contact with predetermined areas of the surface of the blow mold 30.

Further, these areas also provide resistance to gravity stretching of the parison when it is suspended during transfer from one mold to another and prior to expansion. The theory behind this resistance to stretch, is of course, based on the alternate hot and cold circumferential areas having differing rates of cooling and the contraction due to these existing differences in skin temperature. Thus, the lesser chilled circumferential areas will, when exposed to the atmosphere, lose heat at a greater rate than the heavier chilled areas, because of the temperature differential, and will result in the tendency of the parison to contract vertically and thereby counteract any stretching action.

This zonal cooling is in essence the uniform cooling of the parison in a series of horizontal planes through it, coupled with preferential cooling of the surface areas of the parison in a vertical direction.

Modifications may be resorted to within the spirit and scope of the appended claims.

I claim:

1. The method of forming a hollow glass parison which is subsequently blown to a hollow glass article, which method comprises charging a gob of glass into a single piece parison mold having relatively thin walls, pressing said gob into a parison having substantially uniform thickness throughout, cooling the internal surface of the parison during the pressing, applying a cooling fluid to the external surface of the parison mold during the pressing, said cooling fluid being applied in vertically spaced zones, each zone formed of apertures of substantially the same size uniformly spaced peripherally around the mold in horizontal planes, the apertures in one zone differing in size from the apertures of an adjacent zone whereby the amount of fluid applied to horizontal peripheral zones of the parison mold is equal at all areas in any peripheral zone, the amount of cooling fluid applied to each area being such that vertically spaced peripheral zones vary in cooling action upon the parison mold, continuing the cooling until the surfaces of the parison are sufficiently chilled that upon subsequent removal from the parison mold the parison will maintain dimensional stability, and removing the parison from the parison mold.

2. The method of forming hollow glass parisons which are subsequently blown to form hollow glass articles, which method comprises charging a gob of glass into a single piece parison mold, pressing a parison from said gob by causing a hollow plunger to move downwardly into said mold, simultaneously cooling the inner surfaces of said plunger during said pressing thereby chilling the inner surface of the parison, applying cooling fluid during the pressing to vertically spaced zones extending peripherally around the parison mold, said cooling fluid being applied in vertically spaced zones, each zone formed of apertures of substantially the same size uniformly spaced peripherally around the mold in horizontal planes, the apertures in one zone differing in size from the apertures of an adjacent zone whereby the amount of fluid applied to each portion of a peripheral zone is such that the parison mold is equally cooled in every area of said peripheral zone, and the amount of fluid applied to each zone being such that vertically adjacent peripheral zones differ in cooling action on the parison mold, continuing said cooling until the temperature of the surfaces is such that the parison will maintain dimensional stability on removal from the parison mold, and removing the parison from the parison mold.

3. The method of forming a hollow glass parison which is subsequently blown to a hollow glass article, which method comprises charging a gob of glass into a single piece parison mold having relatively thin walls, pressing said gob into a parison having substantially uniform wall thickness throughout, cooling the internal surface of the parison during the pressing, applying cooling fluid to the external surface of the parison mold from a multiplicity of nozzles equally spaced about the periphery of the mold, said cooling fluid being applied in vertically spaced zones, each zone formed of apertures in the nozzles of substantially the same size uniformly spaced peripherally around the mold in horizontal planes, the apertures in one zone differing in size from the apertures of an adjacent zone whereby the amount of fluid applied to the parison mold is such that the cooling action is equal at all areas in any peripheral zone, the cooling action varying between vertically spaced peripheral zones, continuing the cooling until the surfaces of the parison are sufficiently chilled that upon subsequent removal from the parison mold the parison will maintain dimensional stability, and removing the parison from the parison mold.

4. An apparatus for forming hollow glass parisons which are subsequently to be blown into hollow glass articles, said apparatus comprising a single piece parison mold made of heat conducting material and having substantially uniform wall thickness throughout, a plunger of heat conducting material mounted for reciprocating movement into and out of the parison mold, the relative sizes of said plunger and parison mold being such that when the plunger is in its lowermost position the mold cavity thereby formed between the plunger and parison mold is such that a parison formed therein will have a relatively thin wall thickness, means for cooling the plunger during its movement into and out of the cavity, external cooling means for continuously applying cooling fluid to the external surface of the parison mold, said external cooling means comprising a multiplicity of nozzles equally spaced around the periphery of the parison mold, said nozzles having openings of various sizes, the size of the openings in a horizontal plane being equal, the size of the nozzle openings in vertically adjacent planes being unequal thereby providing vertically spaced peripheral zones of cooling fluid about the parison mold.

5. An apparatus for forming hollow glass parisons which are subsequently to be blown into hollow glass articles, said apparatus comprising a single piece parison mold made of heat conducting material and having substantially uniform wall thickness throughout, a plunger of heat conducting material mounted for reciprocating movement into and out of the parison mold, the relative sizes and shapes of said plunger and parison mold being such that when the plunger is in its lowermost position the mold cavity thereby formed between the parison mold and the plunger is such that a parison formed therein will have a wall thickness several times less than the length of the parison and several times less than the diameter of the plunger, means for uniformly cooling the plunger during its movement into and out of the cavity, external cooling means for continuously applying cooling fluid to the external surface of the parison mold, said external cooling means comprising a multiplicity of nozzles equally spaced around the periphery of the parison mold, said nozzles having openings of various sizes, the size of the openings in a horizontal plane being equal, the size of the nozzle openings in vertically adjacent planes being unequal thereby providing vertically spaced peripheral zones of cooling fluid about the parison mold.

References Cited in the file of this patent

UNITED STATES PATENTS

| Number | Name | Date |
|---|---|---|
| 1,057,198 | Winder | Mar. 25, 1913 |
| 1,633,028 | La France | June 21, 1927 |
| 1,798,136 | Barker, Jr. | Mar. 31, 1931 |
| 1,800,191 | Lorenz | Apr. 7, 1931 |
| 1,865,967 | Schoonenberg | July 5, 1932 |
| 2,269,553 | Roessler | Jan. 13, 1942 |
| 2,336,821 | Wadman | Dec. 14, 1943 |
| 2,402,475 | Waterbury et al. | June 18, 1946 |